UNITED STATES PATENT OFFICE.

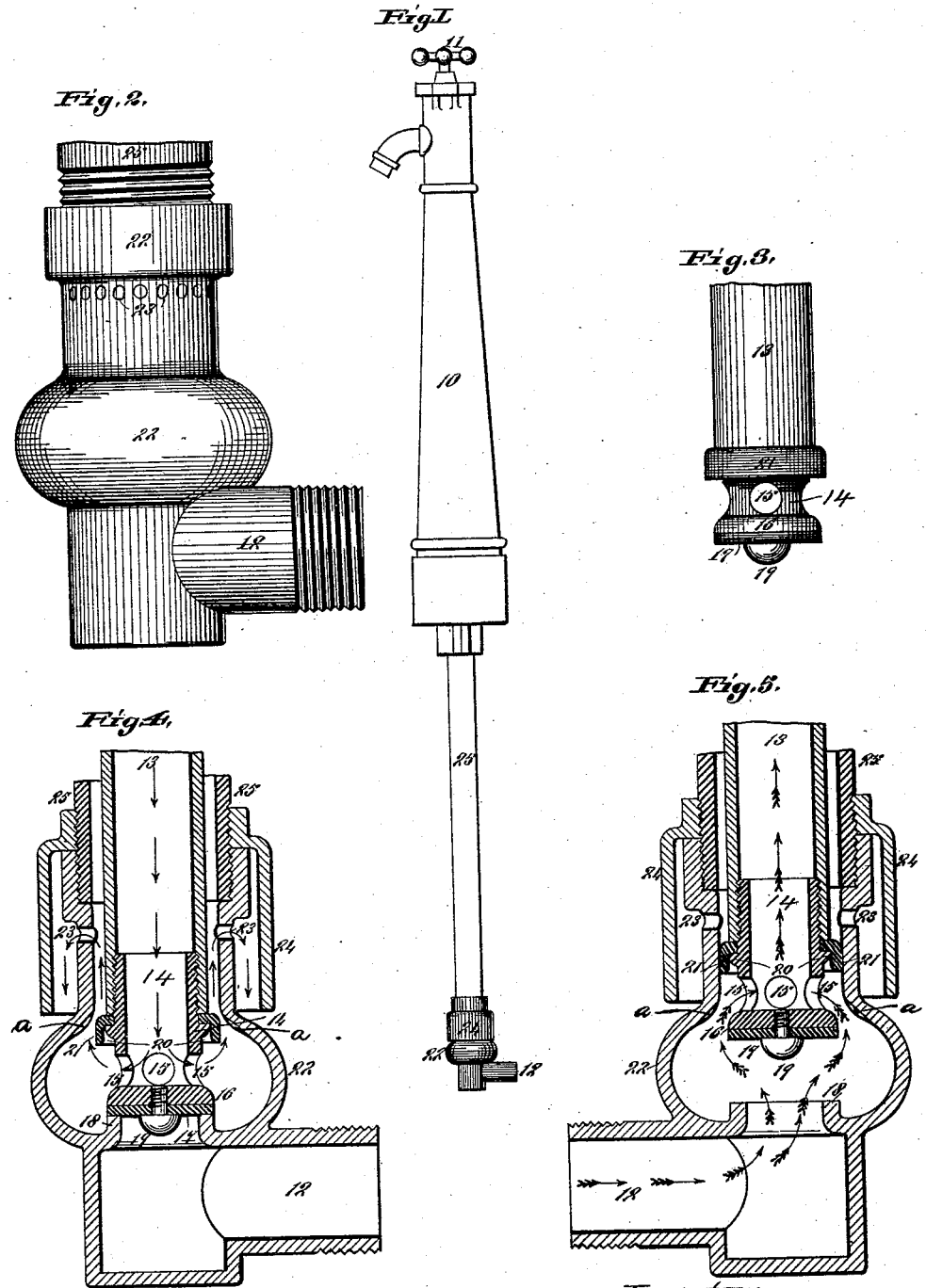

PETER WHITE, OF ST. LOUIS, MISSOURI.

HYDRANT.

SPECIFICATION forming part of Letters Patent No. 455,782, dated July 14, 1891.

Application filed January 27, 1891. Serial No. 379,249. (No model.)

*To all whom it may concern:*

Be it known that I, PETER WHITE, a citizen of the United States, residing at St. Louis, in the State of Missouri, have invented certain new and useful Improvements in Hydrants, of which the following is such a full, clear, and exact description as will enable any one skilled in the art to which it appertains to make and use the same, reference being had to the accompanying drawings, forming part of this specification.

The object of my invention is to provide a simple and efficient means to prevent hydrants from freezing in winter.

My invention will be best understood by referring to the accompanying drawings, in which—

Figure 1 is an elevation of a hydrant, on a reduced scale, provided with my improvement. Figs. 2 and 3 are elevations of details, and Figs. 4 and 5 are vertical sectional views showing the two different positions of the parts.

10 is a hydrant of the customary construction, having a handle 11 for shutting off or turning on the water.

12 is the supply-pipe at considerable distance beneath the surface of the ground and which conveys the water to the hydrant-pipe 13. Into the lower end of the hydrant-pipe 13 is secured a short piece of pipe 14, which has any number of holes 15 therethrough and carries at its lower end a plate 16, shod with leather, rubber, or like substance 17, thereby forming a valve, which seats upon an offset 18, from the supply-pipe 12. The leather or rubber 17 is preferably held to the plate 16 by a suitable screw 19. Between a flange 20 on the short pipe 14 and the lower end of the pipe 13 is gripped a leather, rubber, or other suitable packing 21.

22 is a casing or housing extending from the supply-pipe 12 up around the lower part of the pipe 13, considerable space being left between the pipe 13 and the housing 22. This housing may be provided with suitable holes 23 above the packing 21, and is made of such shape that when the pipe 13 is in its lowest position, so as to close the valve 17 and cut off the supply of water, communication is afforded between the pipe 13 and the holes 23, whereby when the water-supply is turned off the water remaining in the hydrant will drain from the hydrant, as clearly shown by the arrows in Fig. 4, and percolate through the soil, thereby preventing the hydrant from freezing. When the water is turned on and the pipe 13 raised, as shown in Fig. 5, the packing 21 cuts off communication between the holes 23 and the interior of the hydrant and the water passes from the supply-pipe 12 through the hydrant in the direction indicated by the arrows in Fig. 5 and is discharged. The packing forms, in fact, a valve which seats along the housing or casing 22 when the pipe 13 is raised.

The invention is not necessarily limited to holes 23 being used, as any means of affording communication between the interior of the hydrant and the soil when the supply-valve is shut may be employed without departing from the spirit of my invention.

It will be noted that the valve and packing 21 are below the holes 23, through which the water drains from the hydrant, and that the casing 22 will always be full of water up to the level of the holes 23. Consequently the packing 21 will always be submerged in water, and will therefore not become dry and hard, but will always maintain its shape and size, so as to make a tight joint with the casing when the pipe 13 is raised to turn on the water. Back-pressure through the hydrant may sometimes be sufficient to cause the packing 21 to spread out and come against the casing 22 when the parts are in the position shown in Fig. 4, thereby closing communication between the holes 23 and the interior of said casing, so as to prevent the water draining from the hydrant when it is turned off. In order to prevent this, I provide the casing 22 with any number of small ports or grooves $a$ opposite the normal position of the packing 21, so that should said packing be forced against the casing 22 communication between the interior of said casing and the holes 23 will be had through the grooves or ports $a$. It will thus be seen that under no circumstances can communication be cut off between the interior of the hydrant and the holes 23 when the supply-valve is closed. The ports or grooves $a$ are arranged so as to be below the packing 21 when the supply-valve is open, (see Fig. 5,) and therefore do not interfere with the operation of the apparatus when the hydrant is turned on.

In order to prevent the holes 23 from becoming clogged with earth, and thereby stopped up so as to interfere with the operation of the device, I may surround the housing 22 and holes 23 with an open-ended sleeve 24, which at its upper end is screwed into a pipe 25, that is coupled to the upper part of the housing 22 and surrounds the pipe 13. By this means the surrounding earth is kept away from the holes 23 and prevented from obstructing them.

I am aware that it is not broadly new to provide a hydrant with a valve which closes when the water is turned on and which opens when the supply of water is shut off in order to drain off the water remaining in the hydrant. In such previously-constructed devices the leather packing is always in contact with the housing and is confined when the valve is open as well as when closed. This causes the leather packing to lose its life or elasticity, and when the valve is raised and the water turned on the packing will leak, causing the water to pass by the packing and permeate the adjoining ground. Some of these packings leak so much as to often flood cellars, and when a hydrant is placed near the wall of a building and much used the leakage of the supply of water through the hydrant is often so great as to damage the masonry. In some cases the leather packing, when the supply-valve is closed and the drain-ports open, rests against the channels which groove the packing, so that when it is raised the supply of water may leak through the grooves of the packing. In my construction these difficulties are avoided, for when the supply-valve is closed my packing passes wholly out of contact with the housing or any part thereof and is unconfined. Thus the packing may expand and keep its elasticity, it being only confined or crowded against the housing when the supply-valve is open. During all the time the hydrant is not in use the packing is left free and unconfined.

Having fully set forth my invention, what I desire to claim, and secure by Letters Patent of the United States, is—

1. The combination, in a hydrant, of a supply-pipe, a hydrant-pipe, a supply-valve at the lower end of said hydrant-pipe, a housing, and a packing carried by said hydrant-pipe and adapted to seat along said housing when the supply-valve is open and adapted to pass out of contact therewith, so as to freely expand when the supply-valve is closed.

2. The combination, in a hydrant, of a supply-pipe, a hydrant-pipe, a supply-valve at the lower end of said hydrant-pipe, a housing, a packing carried by said hydrant-pipe and adapted to seat along said housing when the supply-valve is open and to pass out of contact therewith, so as to freely expand when the supply-valve is closed, and grooves or ports in said housing opposite the normal position of said packing, for the purpose described.

In testimony whereof I have hereunto set my hand and affixed my seal, this 24th day of January, 1891, in the presence of the two subscribing witnesses.

PETER WHITE. [L. S.]

Witnesses:
A. C. FOWLER,
J. F. WESTON.